INVENTORS
LELAND J. HAWORTH
RICHARD W. LEE
CHALMERS W. SHERWIN
BY *William D. Hall*
ATTORNEY Patented June 20, 1950

2,512,152

UNITED STATES PATENT OFFICE 2,512,152

PULSE DELAY CIRCUIT

Leland J. Haworth, Belmont, Richard W. Lee, Watertown, and Chalmers W. Sherwin, Belmont, Mass., assignors, by mesne assignments, to the United States of America as represented by the Secretary of War Application September 14, 1945, Serial No. 616,375

9 Claims. (Cl. 178—44)

1

This invention relates to electrical circuits and more particularly to such circuits for producing time delays in signals.

In many applications of electrical circuits and systems which involve precise triggering or pulsing it is desirable to synchronously trigger or pulse two or more circuits at two or more repetition rates. It is often desirable also to be able to delay these triggering pulses equally regardless of repetition rates. The repetition rates of the various triggering pulses will normally bear some small integral ratio, say 2, 3, or 4, to each other. For example, a radio object-locating system may use two separate transmitting and receiving systems, one for obtaining azimuth data and one for obtaining elevation data. The effective range of the elevation system will normally be less than that of the azimuth system, and it may, therefore, be operated at a higher repetition rate. Furthermore, such a system may have an elaborate system of cathode ray tube indicators including range-azimuth and range-height presentations. These indications will be essentially sectors taken from the whole search area, and it is necessary that the range-azimuth and range-height presentations be of the same volume in space. To accomplish this, it is generally necesary to provide triggering pulses to the sector selecting circuits which have been equally delayed from some initial triggering pulse or pulses.

It is an object of the present invention, therefore, to provide an electrical circuit providing equal time delays for triggering pulses at two repetition rates.

It is a further object of the present invention to provide an electrical circuit providing equal time delays for triggering pulses at a plurality of repetition rates.

For a better understanding of the invention, together with other and further objects thereof, reference is had to the following description taken in connection with the accompanying drawings in which.

Figure 1:
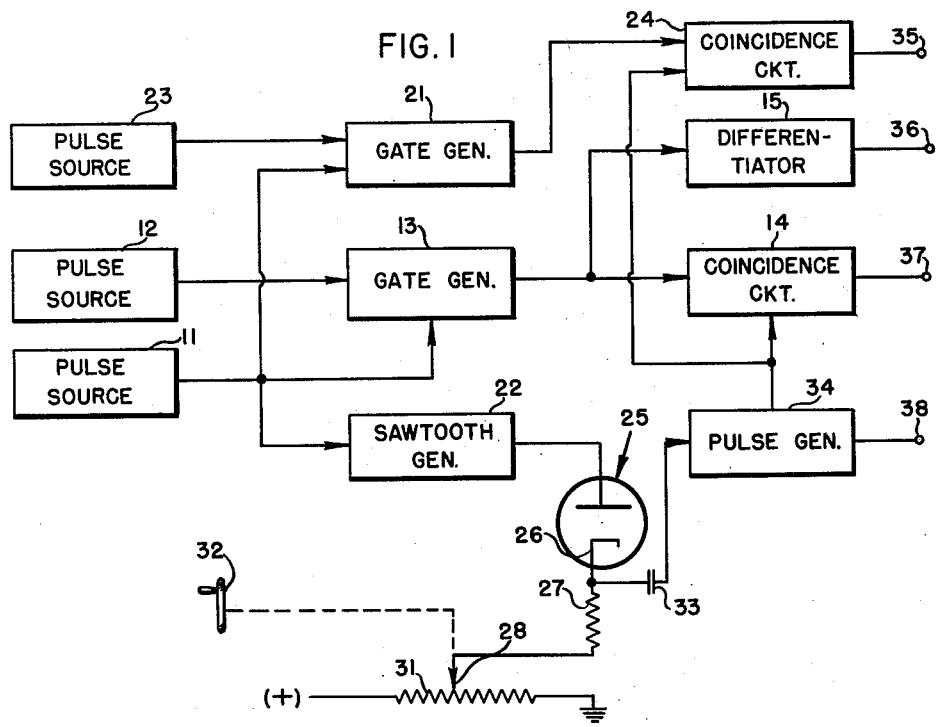
Fig. 1 is a schematic diagram of one embodiment of the present invention.

Reference is now had to the drawings and more particularly to Fig. 1 thereof wherein a preferred embodiment of the present invention is shown comprising pulse sources 11 and 12 electrically connected to a gate generator 13 which is in turn electrically connected to a coincidence circuit 14 and a differentiator circuit 15. The

Figure 2:
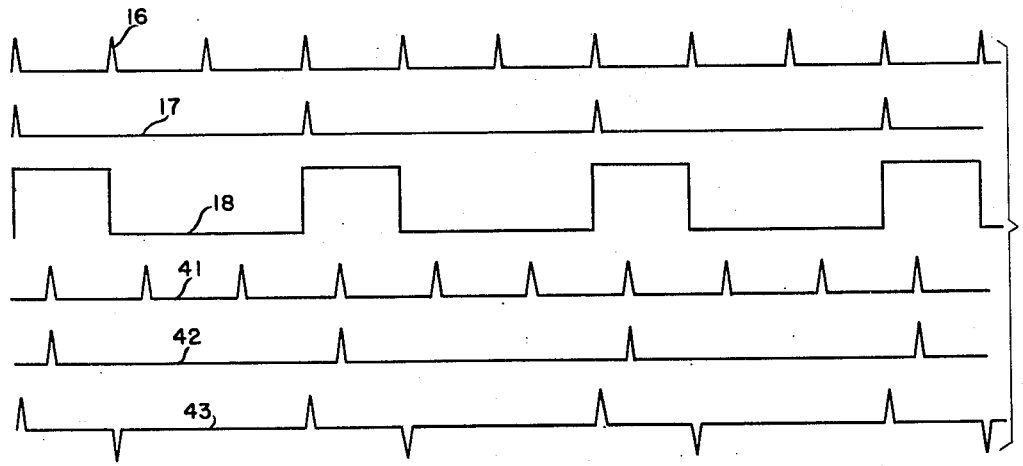
Fig. 2 illustrates a series of waveforms pertinent to the circuit of Fig. 1.

2 pulse sources 11 and 12 will normally be a part of the associated radio object-locating equipment, but they may be any suitable sources providing output pulses, the repetition rates of which bear a fixed integral ratio to each other and which are synchronized with each other, i. e. every Nth pulse in the higher repetition rate series coincides with a pulse in the lower repetition rate series, where N is the ratio of repetition rates. Typical output waveforms from sources 11 and 12 are shown in Fig. 2, respectively, by waveforms 16 and 17. The gate generator 13 is preferably a multivibrator of the flip-flop or one-shot type, but it may be any other circuit capable of producing a rectangular output voltage, the duration of which is determined by the time interval between two input pulses. A typical output waveform from gate generator 13 is shown in Fig. 2 by waveform 18. The coincidence circuit 14 may be any circuit well known in the art providing an output signal when two coincident signals are supplied to the input thereof. The differentiator 15 may be any type well known in the art as, for example, a simple high pass resistance-capacitance coupling circuit having a short time constant. The pulse source 11 is also connected to a second gate generator 21 similar to generator 13, and to a sawtooth generator 22. The sawtooth generator 22 may be any type well known in the art as, for example, such as shown in Figs. 4–25, page 186 of Ultra High Frequency Techniques by J. G. Brainerd, G. Koehler, et al., D. Van Nostrand Inc., 1942. A third pulse source 23 is connected to generator 21 which is in turn connected to a second coincidence circuit 24. The pulse source 23, gate generator 21, and coincidence circuit 24 have been here added to illustrate an expansion of the basic invention to provide equal delays for three or more pulses. The sawtooth generator 22 is connected to a diode type tube 25, the cathode 26 of which is connected through a resistor 27 to a tap 28 on a potentiometer 31. The potentiometer is energized by a suitable source of positive potential. The tap 28 is mechanically connected to a suitable driving means, such as handwheel 32. The cathode 26 of tube 25 is connected, preferably through a blocking capacitor 33, to a pulse generator 34. The pulse generator 34 may be any circuit well known in the art capable of producing an output pulse upon reception of an initiating signal as, for example, a blocking oscillator such as shown in Fig. 34A, page 314 of Radio Engineer's Handbook by F. E. Terman, McGraw-Hill, 1943. The output of pulse generator 34 is connected to coincidence circuits 14 and 24. The sawtooth generator 22, the pulse generator 34, and the coupling circuit comprising tube 25, resistor 27, and potentiometer 31 may be replaced by any other circuit well known in the art for producing a variable delay in an input pulse. For example, a delay multivibrator, such as disclosed in the copending application of Stanley N. Van Voorhis Serial No. 594,258, filed May 17, 1945, might be used. Terminals 35, 36, 37, and 38 are provided respectively at the outputs of coincidence circuit 24, differentiator 15, coincidence circuit 14 and pulse generator 34. The output waveform of pulse generator 34 is shown in Fig. 2 by waveform 41. The output waveform of coincidence circuit 14 and differentiator 15 are shown in Fig. 2 by waveforms 42 and 43 respectively.

The connections from pulse sources 11 and 12 to gate generator 13 are so made that a rectangular gate is started by the lower pulse repetition rate signal and stopped by the next occurring high pulse repetition rate signal. Referring to waveforms 16, 17, and 18, Fig. 2, it will be seen that the rectangular pulse of waveform 18 starts at the time of occurrence of the low pulse repetition rate signal of waveform 17 and ends at the time of occurrence of the next high pulse repetition rate signal of waveform 16. Each of the pulses from source 11 actuate the sawtooth generator 22, thus producing at the anode of tube 25 a voltage which rises linearly with time between each of the pulses from source 11. The cathode 26 is maintained at a fixed potential determined by the setting of the tap 28 on potentiometer 31, and the tube 25 will not conduct until the sawtooth voltage on the anode exceeds this value. When the tube 25 conducts, a signal is developed across resistor 27 which is passed by capacitor 33 to pulse generator 34 wherein a pulse is generated. As before stated, waveform 41, Fig. 2, illustrates the output of pulse generator 34 at terminal 38. It will be noted that the same repetition rate is maintained as from source 11 but that a delay, which is dependent upon the setting of potentiometer 31, has been effected. The output of pulse generator 34, together with the output of gate generator 13 is applied to coincidence circuit 14 which will provide an output pulse when the input signals are coincident. This output at terminal 37 is shown by waveform 42, Fig. 2. It is to be noted that the repetition rate of the output pulses from coincidence circuit 14 is the same as that of the signal from source 12 and further that a delay equal to the delay in the high pulse repetition rate signal has been effected. The operation of the portion of the circuit involving pulse source 23, gate generator 21 and coincidence circuit 24, is exactly analogous to the operation already described, and no further discussion will, therefore, be made. The output at terminal 36 of differentiator 15 shown by waveform 43, Fig. 2, may be used in the associated radio object-locating system in any desired manner as, for example, to indicate on an indicator portraying a time base equal to the period between pulses at the low pulse repetition rate the extent of the portion of the time base included in the period between pulses at the high repetition rate. It will be understood, of course, that if so desired the differentiator may be eliminated entirely from the circuit.

While there has been described what is at present considered the preferred embodiment of the invention, it will be obvious to those skilled in the art that various changes and modifications may be made therein without departing from the invention.

What is claimed is:

1. An electrical circuit providing equal time delays for two series of voltage pulses having unequal repetition rates that bear an integral ratio to one another, said circuit comprising a first and a second pulse source, gate generator means adapted to provide a substantially rectangular voltage pulse the starting time of which is controlled by pulses from said first pulse source and the duration of which is controlled by pulses from said second pulse source, variable delay means adapted to delay pulses from said second pulse source, coincidence means connected to said gate generator means and said delay means, adapted to be actuated when a pulse from said delay means and from said gate generator means coincide, whereby said delay means and said coincidence means provide output pulses corresponding respectively in repetition rates to the pulses from said first and second sources but which have been delayed equally.

2. A circuit for providing equal delays to a first and second series of pulses applied thereto, the repetition rate of said second series of pulses being greater than, and bearing an integral ratio to, that of said first series of pulses, including: square wave generator means adapted to be actuated by a pulse from said first series of pulses, the duration of its square wave output being determined by a pulse from said second series of pulses; delay means adapted to delay pulses from said second series of pulses; coincidence means coupled to said delay means and said square wave generator means, adapted to be actuated when a pulse from said delay means and a square wave from said generator means coincide; whereby the outputs from said coincidence means and said delay means are respectively said first and second series of pulses, equally delayed.

3. The circuit of claim 2, wherein said delay means is variable.

4. The circuit of claim 3, wherein said variable delay means includes a sawtooth generator adapted to be actuated by pulses from said second series of pulses; a diode having a variable bias imposed thereupon and being coupled to said sawtooth generator; and a pulse generator coupled to said diode and said coincidence means, and adapted to be actuated by pulses from said diode.

5. The circuit of claim 2, wherein said delay means is variable, and further including differentiating means coupled to the output of said square wave generator and adapted to resolve each square wave into a positive and negative pulse separated by the width of the wave.

6. A circuit for providing equal delays to a plurality of series of pulses, a given series of said plurality of pulses having a repetition rate greater than, and bearing an integral ratio to, that of the remaining series of pulses, including: a plurality of square wave generator means, each adapted to be actuated respectively by a pulse from one of said remaining series of pulses, the duration of their square wave outputs being commonly determined by a pulse from said given series of pulses; delay means adapted to delay pulses from said given series of pulses; a plurality of coincidence means, each respectively coupled to one of said square wave generators and commonly connected to said delay means, each adapted to be actuated when a pulse from said delay means and a square wave from its respective generator means coincide, whereby the outputs from said delay means and said plurality of coincidence means are respectively said given and said remaining series of pulses, equally delayed.

7. The circuit of claim 6, wherein said delay means is variable.

8. The circuit of claim 7, wherein said variable delay means includes a sawtooth generator adapted to be actuated by pulses from said given series of pulses; a diode having a variable bias imposed thereupon and being coupled to said sawtooth generator, and a pulse generator coupled to said diode and to each of said plurality of coincidence means, and adapted to be actuated by pulses from said diode.

9. The circuit of claim 8, including a plurality of differentiating means respectively coupled to the outputs from said plurality of square wave generators and each adapted to resolve each square wave into a positive and negative pulse separated by the width of the wave.

LELAND J. HAWORTH.
RICHARD W. LEE.
CHALMERS W. SHERWIN.

REFERENCES CITED

The following references are of record in the file of this patent:

UNITED STATES PATENTS

| Number | Name | Date |
|---|---|---|
| 2,394,990 | Eisler et al. | Feb. 19, 1946 |